(12) United States Patent
Sonoda

(10) Patent No.: US 7,023,656 B2
(45) Date of Patent: Apr. 4, 2006

(54) DISK DEVICE PREVENTING MECHANISM LOCKING

(75) Inventor: Yoshinori Sonoda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 94 days.

(21) Appl. No.: 10/458,582

(22) Filed: Jun. 11, 2003

(65) Prior Publication Data

US 2004/0047069 A1 Mar. 11, 2004

(30) Foreign Application Priority Data

Sep. 11, 2002 (JP) ............................. 2002-265873

(51) Int. Cl.
*G11B 17/04* (2006.01)
(52) U.S. Cl. .................... 360/99.06; 720/633
(58) Field of Classification Search .............. 360/99.06, 360/99.07; 720/633
See application file for complete search history.

(56) References Cited

U.S. PATENT DOCUMENTS 5,657,184 A * 8/1997 Sawada et al. .......... 360/99.06
2001/0048572 A1* 12/2001 Kojima ..................... 360/99.06

FOREIGN PATENT DOCUMENTS

JP 63-114446 U 7/1988

* cited by examiner

*Primary Examiner*—David Davis
(74) *Attorney, Agent, or Firm*—Birch, Stewart, Kolasch & Birch, LLP

(57) ABSTRACT

A disk device having a disk loading mechanism including an elastic body retracting space which is formed by cutting away a corner portion of a support portion of a first selector lever that is positioned forward of an elastic body and is closer to a chassis, the elastic member retracting space is not so spacious as to receive a whole of the elastic body but is spacious enough for the elastic body to be displaced while being twisted to the elastic body retracting space when the elastic body is sunk under a protruding portion of the chassis.

2 Claims, 5 Drawing Sheets

DISK DEVICE PREVENTING MECHANISM LOCKING

BACKGROUND OF THE INVENTION

1. Field of the Invention

The present invention relates to a desk device provided with a disk loading mechanism for transferring a disk when loading or unloading of a disk is performed.

2. Description of Related Art

FIG. 3 is a perspective view of a conventional disk device when its outside is viewed from above in a slanting direction. FIG. 4 is a perspective view of the disk device shown in FIG. 3 when its inside is viewed from below in a slanting direction. FIG. 5 is a perspective view to show the structure of a first selection lever of the disk device shown in FIG. 3 and FIG. 4. FIG. 6A to FIG. 6C are cross sectional views taken along a line VI—VI in FIG. 5 to show variations in a positional relationship between a chassis and the first selector lever and a second selector lever when a disk is normally unloaded. FIG. 7A and FIG. 7B are cross sectional views taken along a line VII—VII in FIG. 5 to show variations in the positional relationship between the chassis and the first selector lever and the second selector lever when a discrepancy of driving timing occurs. At this point, they are depicted as that, in FIG. 4 to FIG. 7B, the right side is a front side and the left side is a rear side. For this reason, an A direction shown by an arrow A, which will be described later, is a direction from the front side to the rear side and a B direction shown by an arrow B is a direction opposite thereto.

In the drawings, a reference numeral 1 denotes a box shaped chassis (case) to function as a package of the disk device and the chassis 1 has a slot 2 through which a disk (not shown) is loaded and unloaded, as shown in FIG. 3 and FIG. 4, and the slot 2 is provided with a shutter 3 which is turnably mounted thereon for opening or closing the slot 2a. In other words, the disk (not shown) can be loaded along the A direction and can be unloaded along the B direction. An angled protruding portion 1a, as shown in, for example, from FIG. 6A to FIG. 6C and the like, is formed at an edge portion of the slot 2 on inside of an upper bottom surface of the chassis 1 forming a part of the slot 2. Further, a driving motor 4 that provides a driving force for transferring the disk (not shown) is mounted at an edge portion of the slot 2 on an inside of one side of the chassis 1 forming a part of the slot 2. The driving motor 4, as shown in FIG. 4, is so arranged as to provide the first selector lever 6 and the second selector lever 7 with a driving force via a gear 5 and the like.

The first selector lever 6, as shown in FIG. 5 for example, has a rack 6a which is formed at a front position near the slot 2 in such a way that it can engage with the gear 5, an elastic body 8 which is mounted on a side away from the slot 2 and can abut against the protruding portion 1a of the chassis 1, a plate shaped support portion 6b which supports the elastic body 8 in a cantilever manner, a guide claw 6c which slides on a guide part 1b mounted on the upper bottom surface of the chassis 1, and a hook portion 6d which is formed at a rearmost portion and is connected to an urging member (not shown) for urging the first selector lever 6 in the A direction so as to return the first selector lever 6 to an original position in backside. The elastic body 8 is generally formed by a plate portion 8a which is integrated with the support portion 6b and has the nearly the same thickness as the support portion 6b and a rising portion 8b which rises from the plate portion 8a to the chassis 1 side. The elastic body 8 can bend with respect to the support portion 6b but it is not changed itself in volume. When the first selector lever 6 which is formed as described above is supplied with a driving force of the driving motor 4, it can reciprocate along the A direction and the B direction in a straight line region close to the protruding portion 1a of the chassis 1.

The second selector lever 7 is formed by, as shown in from FIG. 6A to FIG. 7B, a rising portion 7a which rises toward the first selector lever 6, a rack (not shown) that is formed at a front of the rising portion 7a and can engage with the gear 5, and a hook portion (not shown) that is formed at the rearmost portion and is coupled to an urging member (not shown) for always urging the second selector lever 7 in the A direction so as to return the second selector lever 7 to an original position in backside. When the second selector lever 7 is supplied with the driving force of the driving motor 4, it can reciprocate along the A direction and the B direction in a straight line region close to the first selector lever 6 at a driving start timing which is different from a driving start timing of the first selector lever 6.

In the chassis 1, a transfer rubber roller (not shown) that is rotated forward and backward to load and unload the disk (not shown) is arranged near the slot 2. Further, on the upper bottom surface of the chassis 1, as shown in FIG. 3, is arranged a sliding member 9 that when the disk (not shown) is loaded, is moved backward (in the A direction) to position the disk (not shown). In the chassis 1, as shown in FIG. 3, there is arranged a trigger member 10 that moves the first selector lever 6 in a manner operatively connected to the loading of the disk (not shown) to a position where the driving force of the driving motor 4 is transmitted to the first selector lever 6 thereby to switch a horizontal movement (in the A direction and in the B direction) of the disk (not shown) to a downward movement of the disk. At this point, the above respective portions and members construct a disk loading mechanism.

Next, an operation will be described.

First, when the disk (not shown) is inserted from the slot 2, the disk is pulled into the chassis 1 by the driving force of rotation in the normal direction of the transfer rubber roller (not shown). Next, one portion of a periphery of the disk (not shown) abuts against the sliding member 9 to retract the sliding member 9 thereby to position the disk (not shown). At this time, the trigger member 10 which is operatively connected to the retracting operation of the sliding member 9 pushes the first selector lever 6 toward the front side (in the B direction) to make the first selector lever 6 abut against the gear 5. Thus, the first selector lever 6 is supplied with the driving force of the driving motor 4 to start moving forward. When the first selector lever 6 moves forward to a predetermined position, the first selector lever 6 interferes with the second selector lever 7 and then the second selector lever 7 is pulled by a straight movement of the first selector lever 6 to be made abut against the gear 5. Thus, the second selector lever 7 is supplied with the driving force of the driving motor 4 to start moving forward, thereby moving to a predetermined final position.

Next, when the disk (not shown) is unloaded, the first selector lever 6 and the second selector lever 7 that are made to abut against the gear 5 by the driving force of the driving motor 4, are linearly moved backward (in the A direction) at the same time. When the second selector lever 7 is separated from the gear 5 at a predetermined position, the driving force supplied to the second selector lever 7 by the driving motor 4 is stopped and then the second selector lever 7 is pushed backward (in the A direction) to a normal position by the first selector lever 6 that continues being made to abut against the gear 5 and hence being driven by the driving motor 4 to a predetermined position. In other words, when attention is paid to variations in a relative positional relationship among the protruding portion 1a of the chassis 1, the elastic body 8 mounted on the first selector lever 6 and the rising portion 7a of the second selector lever 7, as shown in FIG. 6A, first, when the rising portion 7a of the second selector lever 7 is supplied with the driving force of the driving motor 4, it is moved in the A direction to a position directly below (proximity position) the protruding portion 1a of the chassis 1 and the second selector lever 7 is separated from the gear 5. Then, as shown in FIG. 6B, the rising portion 8b of the elastic body 8 of the first selector lever 6 that continues to be supplied with the driving force of the driving motor 4, is made to abut against the protruding portion 1a of the chassis 1 thereby to be pressed and sunk downward. By this downward movement of the elastic body 8, the plate portion 8a of the elastic body 8 is made to abut against a side surface of the rising portion 7a of the second selector lever 7. Thus, as shown in FIG. 6C, along with movement in the A direction of the first selector lever 6 that continues to be supplied with the driving force of the driving motor 4, the second selector lever 7 is returned back in the A direction to the normal position.

However, because the conventional disk device has a structure as described above, it presents the following problem. That is to say, if the first selector lever 6 and the second selector lever 7 are moved and made to abut against the gear 5, for example, by a shock or the like in a state where the disk (not shown) is not loaded in the disk device, the first selector lever 6 and the second selector lever 7 start to be linearly moved at the same time by the gear 5 when a next disk loading operation is performed, that is, a discrepancy of driving timing (hereinafter also referred to as discrepancy of mode) occurs. At this time, the first selector lever 6 is not moved to a position where the disk is completely loaded and then is changed to an unloading operation. At this point, as shown in FIG. 7A, the elastic body 8 of the first selector lever 6 and the rising portion 7a of the second selector lever 7 will pass under the protruding portion 1a of the chassis 1 at the same time, so that, as shown in FIG. 7B, the plate portion Ba of the elastic body 8 of the first selector lever 6 which is pressed downward by the protruding portion 1a of the chassis 1, interferes with an upper surface of the rising portion 7a of the second selector lever 7. For this reason, both of the first selector lever 6 and the second selector lever 7 are in a state where they are made to abut against the gear 5, thereby moving both selector levers 6, 7 presents a problem of bringing both the selector levers 6, 7 into a locking state.

SUMMARY OF THE INVENTION

The present invention has been made to solve the above described problem and it is the object of the present invention to provide a disk device having a disk loading mechanism that even when a discrepancy of driving timing occurs, two selector levers are not brought into a locking state.

A disk device in accordance with the present invention has a disk loading mechanism including: a chassis having a protruding portion on its inside surface; a driving motor that is arranged in the chassis and supplies a driving force for transferring a disk; a first selector lever that is supplied with the driving force of the driving motor to reciprocate in a straight line region close to the protruding portion of the chassis; a second selector lever that is supplied with the driving force of the driving motor to reciprocate in a straight line region close to the first selector lever at a driving start timing different from a driving start timing of the first selector lever; an elastic body that is mounted on the first selector lever in a cantilever manner and when the first selector lever reciprocates, is pressed and moved to the second selector lever side by the protruding portion of the chassis, thereby being made to abut against the second selector lever that is cut off from the driving force from the driving motor to return the second selector lever to a predetermined position; and an elastic body retracting space that is provided at the proximity position of the elastic body of the first selector lever.

Therefore, according to the present invention, even if a discrepancy of timing occurs in which driving start timings coincide with each other, by means of retracting the elastic body into the elastic body retracting space, it is possible to surely prevent the first and second selector levers from being locked. This makes to return the first selector lever and the second selector lever to a normal state in which the driving start timing of the first selector lever is different from the driving start timing of the second selector lever, thereby it can produce an effect of restarting the disk device.

DETAILED DESCRIPTION OF THE PREFERRED EMBODIMENT

The preferred embodiment of the present invention will be described.

Embodiment 1

Figure 1:
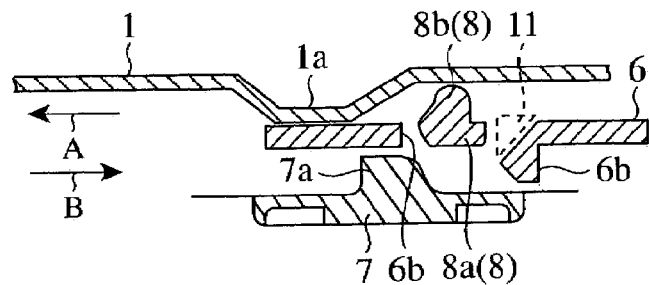
FIG. 1 is a cross sectional view to show a relevant part of a disk device in accordance with Embodiment 1 of the present invention.
Figure 2A:
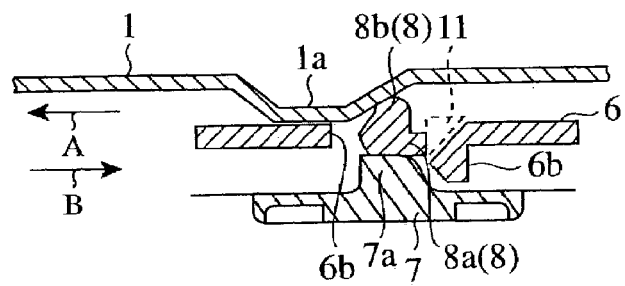
FIG. 2A to FIG. 2C are cross sectional views to show retracting operation of an elastic body when a discrepancy of timing occurs in the disk device shown in FIG. 1.
Figure 2B:
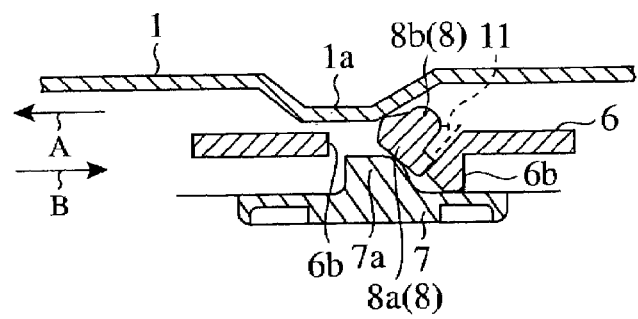
Figure 2C:
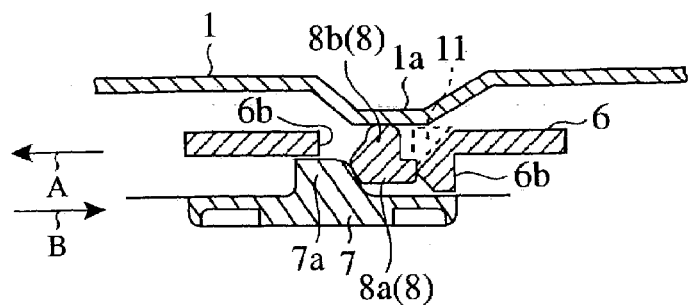
Figure 3:
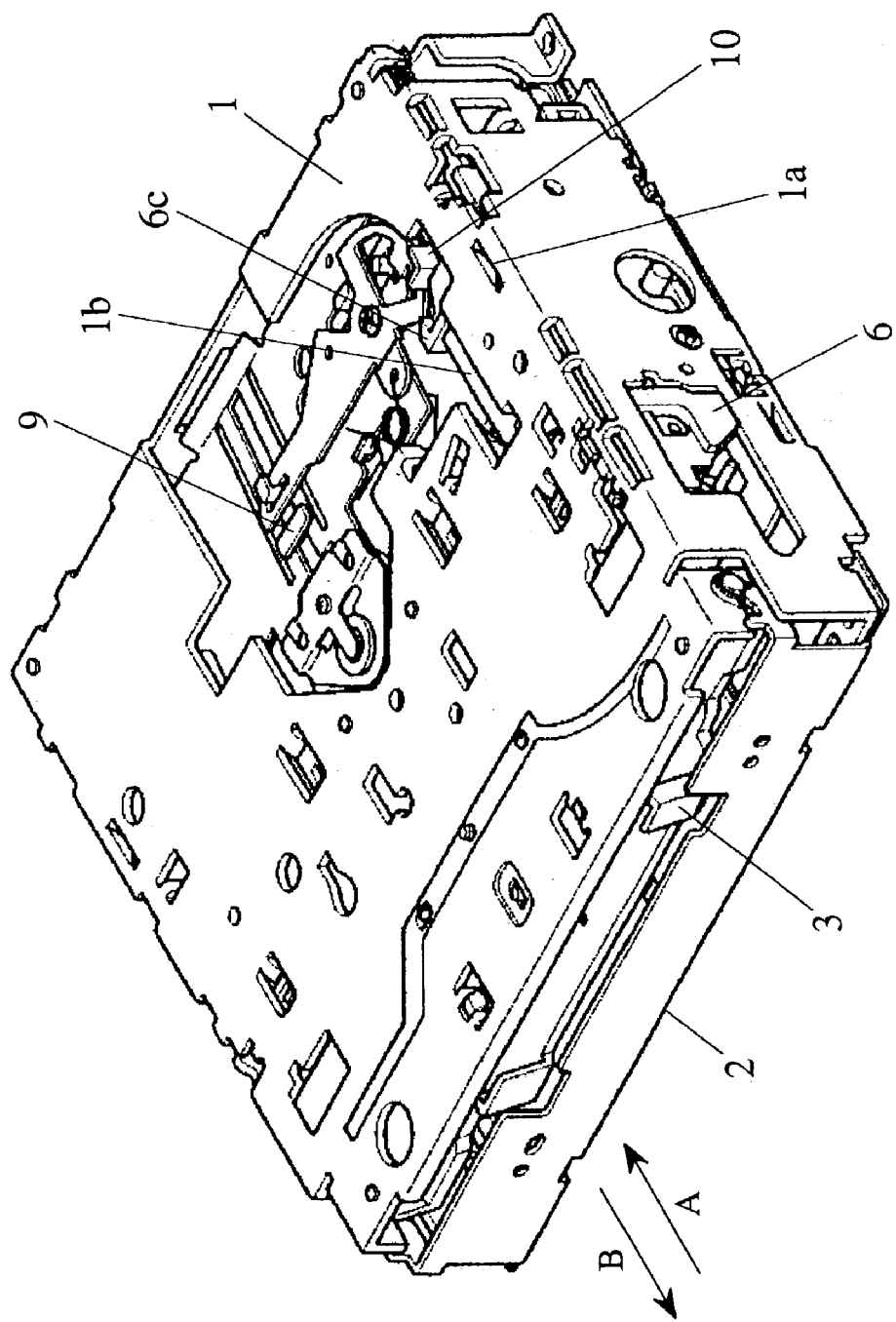
FIG. 3 is a perspective view of a conventional disk device when an outside of the device is viewed from above in a slanting direction.
Figure 4:
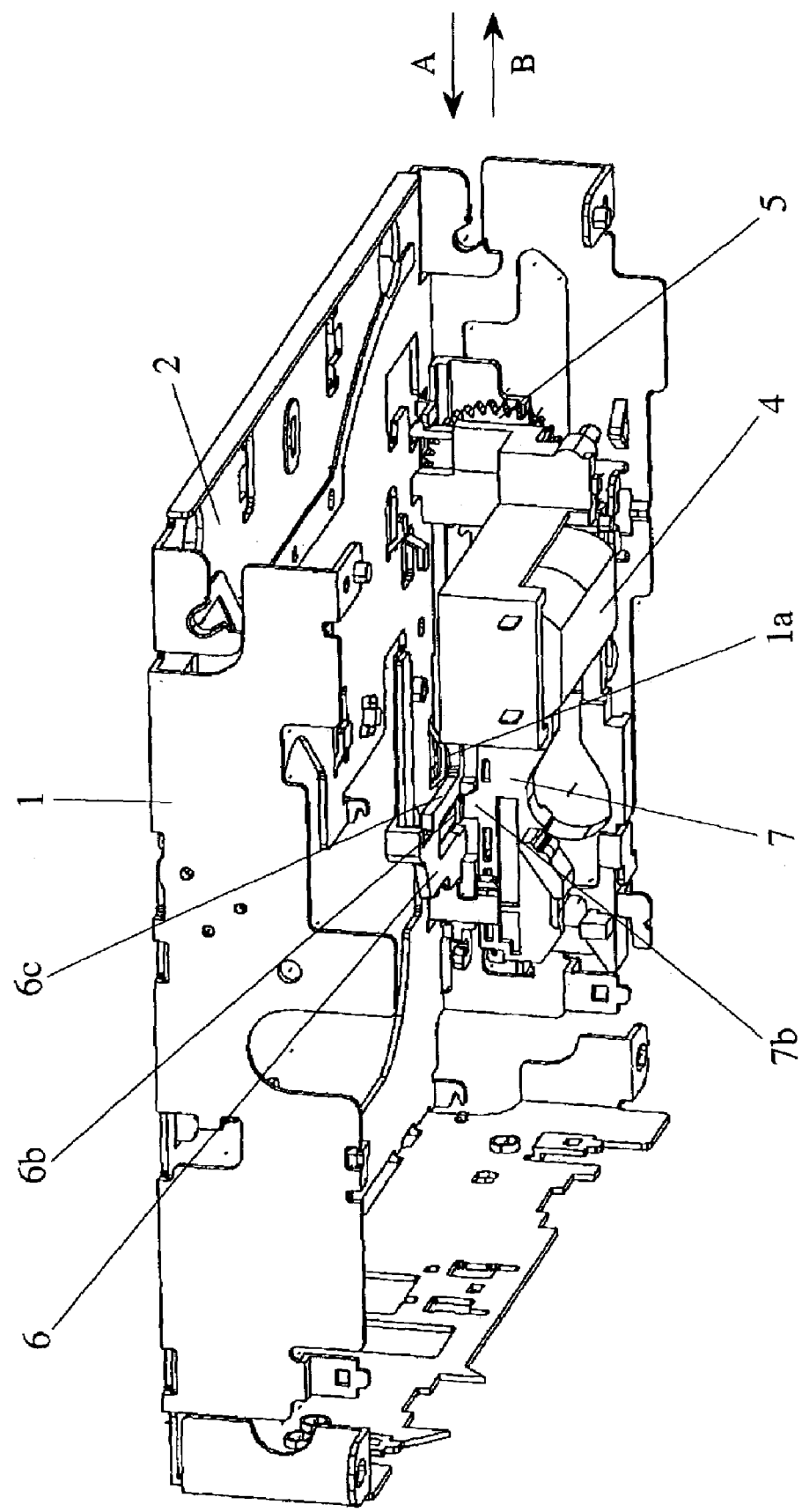
FIG. 4 is a perspective view of the disk device shown in FIG. 3 when the inside of the device is viewed from below in a slanting direction.
Figure 5:
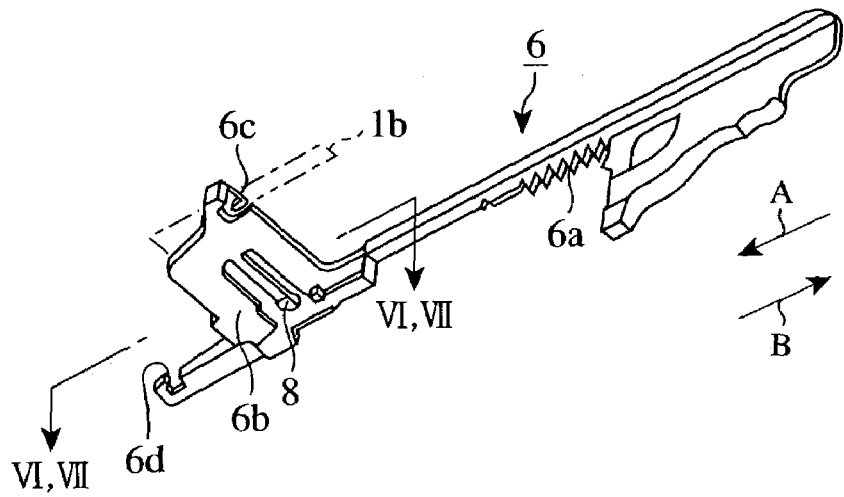
FIG. 5 is a perspective view to show the structure of a first selector lever of the disk device shown in FIG. 3 and FIG. 4.
Figure 7A:
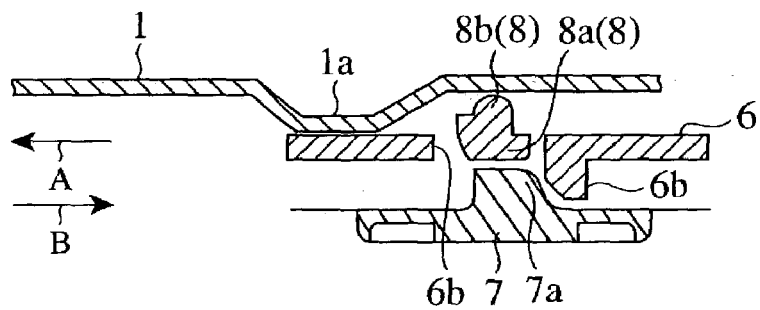
FIG. 7A and FIG. 7B are cross sectional views taken along a line VII—VII in FIG. 5 to show variations in the positional relationship among the chassis, the first selector lever and the second selector lever when a discrepancy of driving timing occurs.
Figure 7B:
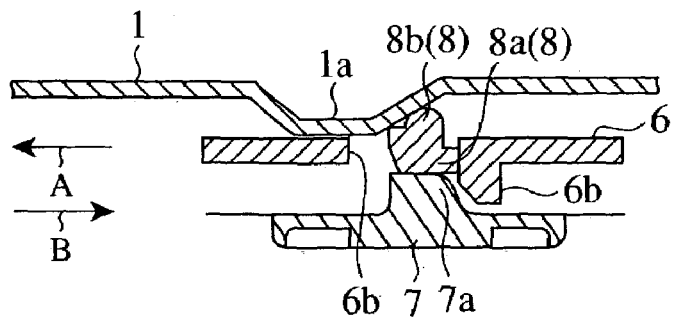
Figure 6A:
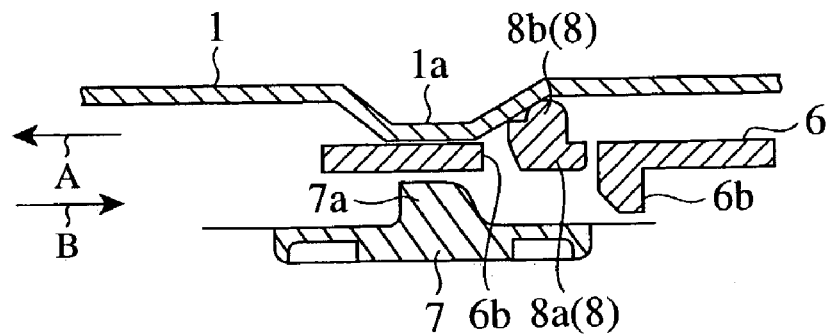
FIG. 6A to FIG. 6C are cross sectional views taken along a line VI—VI in FIG. 5 to show variations in the positional relationship among a chassis, the first selector lever and a second selector lever when a disk is normally unloaded.
Figure 6B:
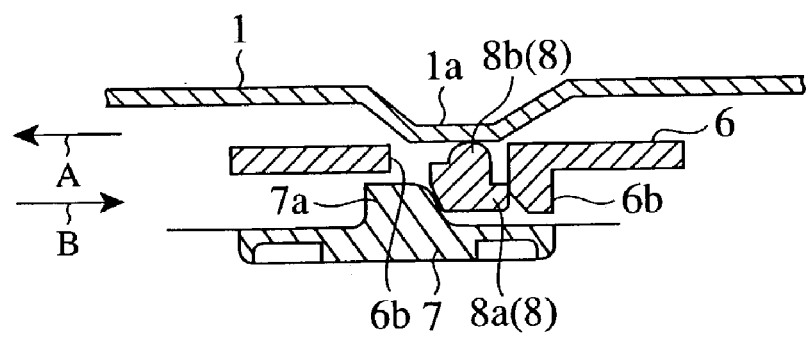
Figure 6C:
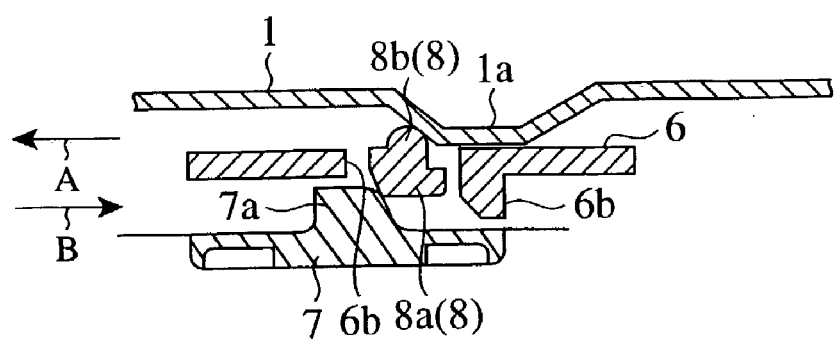

FIG. 1 is a cross sectional view to show the relevant part of a disk device in accordance with embodiment 1 of the present invention. FIG. 2A to FIG. 2C are cross sectional views to show a retracting operation of an elastic body when a discrepancy of timing occurs in the disk device shown in FIG. 1. At this point, the respective constituent elements of the disk device in accordance with this embodiment 1 that are common to those of the conventional device shown in from FIG. 3 to FIG. 7B are denoted by the same reference symbols and their further descriptions will be omitted.

Further, FIG. 1 to FIG. 2C are cross sectional views which are corresponding to from FIG. 6A to FIG. 7B.

A feature of the embodiment 1 lies in a point that, as shown in FIG. 1, in the support portion 6b of the first selector lever 6, a corner portion that is positioned forward of the elastic body 8 and is nearer to the chassis 1, is cut away to form an elastic body retracting space 11 into which the elastic body 8 can retract. The elastic body retracting space 11 is not so spacious as to receive a whole elastic body 8, but is spacious enough for the elastic body 8 to be displaced while being twisted when the elastic body 8 is sunk below the protruding portion 1a of the chassis 1.

Next, an operation will be described.

As for an operation of loading the disk (not shown) and an operation of unloading the disk are not different except for the following point. That is to say, if in a state where the disk (not shown) is not inserted into the disk device, the first selector lever 6 and the second selector lever 7 are moved by, for example, a shock or the like with no predetermined spacing between them thereby to abut against the gear 5, when a disk is next loaded, a discrepancy of mode occurs in which the first selector lever 6 and the second selector lever 7 start to be linearly moved by the gear 5. At this time, the first selector lever 6 is not moved to a position where the disk is completely loaded and then is changed to an unloading operation. At this point, as shown in FIG. 2A, the elastic body 8 of the first selector lever 6 and the rising portion 7a of the second selector lever 7 are about to pass respectively under the protruding portion 1a of the chassis 1 at the same time. Next, as shown in FIG. 2B, the elastic body 8 of the first selector lever 6 abutting against the protruding portion 1a of the chassis 1 is retracted while turning to the elastic body retracting space 11, so that the rising portion 7a of the second selector lever 7 can be moved ahead of the first selector lever 6 with a predetermined spacing. Next, as shown in FIG. 2C, the elastic body 8 is pushed out of the elastic body retracting space 11 and the plate portion 8a of the elastic body 8 abuts against the side surface of the rising portion 7a of the second selector lever 7 that is separated from the gear 5 and hence is cut off from the driving force, so that the second selector lever 7 is pushed back in the A direction to the normal position along with the movement in the A direction of the first selector lever 6 that continues to be supplied with the driving force of the driving motor 4.

As described above, according to the embodiment 1, the elastic body retracting space 11 is provided at the proximity position of the elastic body 8 of the first selector lever 6, so that even if a discrepancy of timing occurs in which timings of starting to drive the respective selector levers 6, 7 coincide with each other and hence both the selector levers 6, 7 are moved with no predetermined spacing between them, by means of retracting the elastic body 8 into the elastic body retracting space 11, it is possible to surely prevent the first selector lever 6 and the second selector lever 7 from being locked. This makes to return the first selector lever 6 and the second selector lever 7 to a normal state in which the driving start timing of the first selector lever 6 is different from the driving start timing of the second selector lever 7, thereby it can produce an effect of restarting the disk device.

What is claimed is:

1. A disk device having a disk loading mechanism comprising:
   a chassis having a protruding portion on its inside surface;
   a driving motor that is arranged in the chassis and supplies a driving force for transferring a disk;
   a first selector lever that is supplied with the driving force of the driving motor to reciprocate in a straight line region close to the protruding portion of the chassis;
   a second selector lever that is supplied with the driving force of the driving motor to reciprocate in a straight line region close to the first selector lever at a driving start timing different from a driving start timing of the first selector lever; and
   an elastic body that is mounted on the first selector lever in a cantilever manner and when the first selector lever reciprocates, is pressed and moved to the second selector lever side by the protruding portion of the chassis, thereby being made to abut against the second selector lever that is cut off from the driving force of the driving motor to return the second selector lever to a predetermined position, wherein,
   an inclined plane whose width is substantially the same as a height of the elastic body, is formed facing the elastic body at an upper side of the first selector lever.

2. A disk device having a disk loading mechanism comprising:
   a chassis having a protruding portion on its inside surface;
   a driving motor that is arranged in the chassis and supplies a driving force for transferring a disk;
   a first selector lever that is supplied with the driving force of the driving motor to reciprocate in a straight line region close to the protruding portion of the chassis;
   a trigger member that is arranged in the chassis and is operatively connected to inserting of the disk to move the first selector lever to a position where the driving force of the driving motor is transmitted to the first selector lever;
   an elastic body that is mounted on the first selector lever and when the first selector lever reciprocates, is pressed and moved by the protruding portion of the chassis; and
   a second selector lever that is operated at a driving start timing different from a driving start timing of the first selector lever to reciprocate at a predetermined spacing between the second selector lever and the first selector levers wherein,
   an inclined plane whose width is substantially the same as a height of the elastic body, is formed facing the elastic body at an upper side of the first selector lever even when the first selector lever and the second selector lever are moved without a predetermined spacing between them, the elastic body mounted on the first selector lever so as to push back the second selector lever to a predetermined position, is pressed and moved to the second selector lever side by the protruding portion of the chassis and is retracted to the inclined plane in a state where it abuts against the second selector lever cut off from the driving force from the driving motor.

* * * * *